Figure 1:
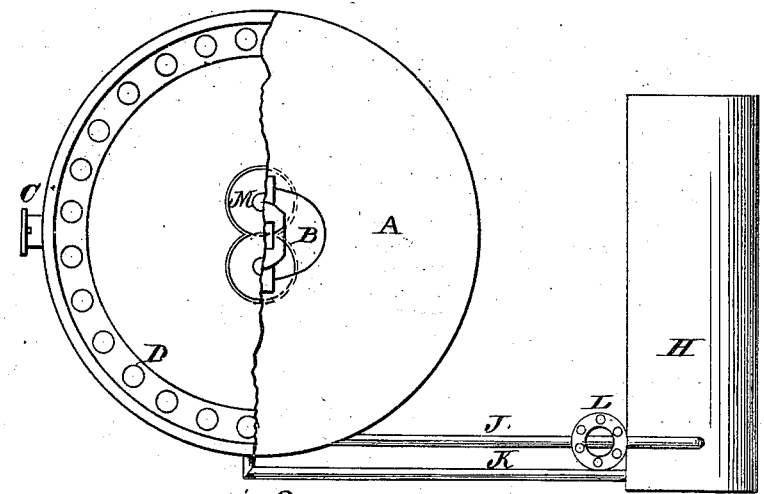

W. W. HARDING.
Apparatus for Adjusting and Macerating Fibers by Chemical Re-agents.

No. 197,850. Patented Dec. 4, 1877.

UNITED STATES PATENT OFFICE.

WILLIAM W. HARDING, OF PHILADELPHIA, PENNSYLVANIA.

IMPROVEMENT IN APPARATUS FOR DIGESTING AND MACERATING FIBERS BY CHEMICAL REAGENTS.

Specification forming part of Letters Patent No. 197,850, dated December 4, 1877; application filed February 22, 1877.

*To all whom it may concern:*

Be it known that I, WILLIAM W. HARDING, of the city of Philadelphia and State of Pennsylvania, have invented certain new and useful Improvements in Apparatus for Digesting and Macerating Ligneous Fiber and other Substances by Chemical Reagents; and I do hereby declare the following to be a sufficiently full, clear, and exact description thereof to enable others skilled in the art to make and use the same, reference being had to the drawing annexed, and letters of reference marked thereon.

The nature of my invention consists in applying to a closed vessel, in which the matter for chemical treatment is placed, a series of conducting-pipes, through which steam or highly-heated water is circulated, so that a circulation of the fluid used to effect the chemical reaction ensues from the imparting of heat to it; also, in a means of agitating and thoroughly circulating the fluid through the matter inclosed; and, also, in the arrangement of pipes and boiler for insuring a rapid convection and conduction of heat from the steam or hot water of the boiler to the digester and its contents, and secure the most rapid heating of the digester and its contents, and at the same time to return the condensed water with the least loss of temperature to the boiler, and, by reason of each pipe contained within the digesting-vessel being free to expand and contract without strain, I am enabled to avoid leaks therein, and thus prevent the straining or soiling of the contents of the digester.

By this process I am enabled to treat ligneous fibers, for the purpose of producing pulp for paper and other purposes, with greater celerity and cleanliness, and less risk of discoloration from the metal of the heating apparatus and the impurities in the contained water than has been heretofore accomplished.

Figure 2:
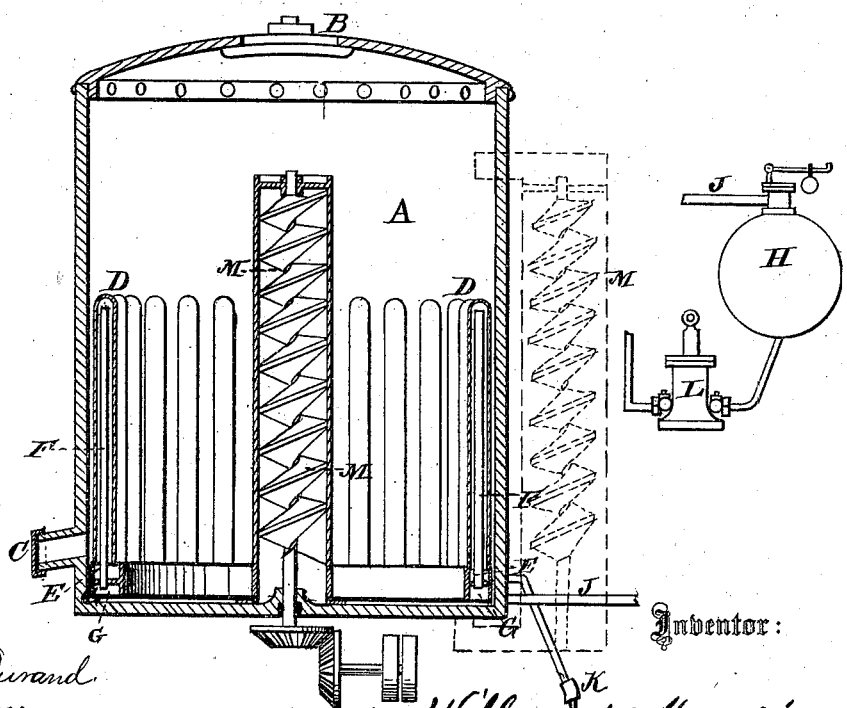

Figure 1 shows a plan, and Fig. 2 an elevation, in section, of this apparatus.

The same letters of reference apply to the same parts in the several figures.

A is a strong steam and fluid vessel, made preferably of metal plates, with cylindrical sides and hemispherical or spheroidal top and bottom, and forms the body of the digester. This should be strong enough to safely retain steam of a pressure of ninety pounds per square inch above the pressure of the atmosphere, high pressure being necessary to procure the temperature required for the chemical reactions conducted in this vessel.

A man-hole or door, B, is formed in the top of the vessel A, for the purpose of introducing the charge of material, and a gate or valve, C, is made in the bottom, or in the side near the bottom, for the purpose of emptying the macerated or digested product.

In the tank A, I place a series of heating-pipes, D. Each pipe is closed at its upper end, and has its lower end inserted, preferably, by screwing into a chamber, E. Each of the pipes D is supplied with steam by a pipe, F, reaching nearly to the upper end of the pipe D from the chamber G. The chamber G is formed in one piece with the chamber E, and is preferably made, on plan view, in the form of a ring, either in a single ring or in segments.

I introduce to the chamber G a supply of steam from the boiler H, from the top of said boiler H, by a pipe, J, and I return the condensed water from the chamber E by means of the pipe K to the boiler, by gravitation, when the apparatus is so situated as to permit it, but employ, when needed, from the higher location of the boiler, a pump, L.

In the vessel A, I locate a pump, M, for circulating the contents. This pump M may be placed, as shown, in the body of the vessel A, or it may be placed in a side or bottom pipe, or other communicating chamber, as shown in the dotted line.

The operation of the apparatus is, that the solution, generally of a caustic alkali, being filled into the vessel around the wood fiber or other matter in a divided state, circulates through the mass by the heat imparted to it from the pipes D, and is further agitated and circulates through the mass by the pump M. The steam condensed in the pipes D returns through the pipe K, thus avoiding the risks of scorching and discoloring the ligneous fiber or resultant pulp by passing the solution through coils of furnaces, as has been heretofore practiced.

What I claim as my invention is—

1. The combination of the pipes D and F and chambers E and G with the digesting-vessel A, in the manner and for the purpose set forth.

2. The combination of the pump M with the vessel A and pipes D and F and chambers E and G, for circulating the liquor in said vessel, as and for the purpose set forth.

3. The combination of the boiler H, vessel A, pipes D and F, and chambers E and G, substantially as and for the purpose set forth.

4. In a digester for macerating under pressure at high temperatures, the combination of tubes and chambers therewith connected, free to expand and contract without strain upon their joints, and separating the heat-conveying fluid from the contents of the digester, substantially as and for the purpose set forth.

W. W. HARDING.

Witnesses:
J. R. McFETRIDGE,
CHAS. J. HEDRICK.